(12) United States Patent
Bayha et al.

(10) Patent No.: US 7,217,071 B2
(45) Date of Patent: May 15, 2007

(54) METHOD FOR TESTING THE FIT OR IMBALANCE OF A TOOL

(75) Inventors: Thomas Bayha, Markgroningen (DE); Andreas Berger, Nurtingen (DE)

(73) Assignee: Cross Huller GmbH (DE)

( * ) Notice: Subject to any disclaimer, the term of this patent is extended or adjusted under 35 U.S.C. 154(b) by 0 days.

(21) Appl. No.: 11/458,724

(22) Filed: Jul. 20, 2006

(65) Prior Publication Data

US 2007/0036624 A1 Feb. 15, 2007

(30) Foreign Application Priority Data

Jul. 21, 2005 (EP) ............................... 05 015 830

(51) Int. Cl.
*B23C 9/00* (2006.01)
*B23Q 15/00* (2006.01)

(52) U.S. Cl. .................... 409/131; 409/208; 409/210; 409/187; 408/8; 408/16; 700/175; 33/636; 33/DIG. 21; 356/621

(58) Field of Classification Search ........ 409/131–132, 409/134, 186–188, 193–195, 207–208, 218, 409/214, 210; 408/8, 13, 16; 356/638, 153, 356/614–615, 621; 33/636, 639, 642, 412, 33/286, DIG. 21; 700/177, 174–175
See application file for complete search history.

(56) References Cited

U.S. PATENT DOCUMENTS

| | | | | |
|---|---|---|---|---|
| 3,795,449 A * | 3/1974 | McKay, Sr. | ................. | 356/621 |
| 4,566,202 A * | 1/1986 | Hamar | ..................... | 33/286 |
| 4,966,460 A * | 10/1990 | Kahley | ..................... | 356/640 |
| 5,286,042 A * | 2/1994 | Laube | ..................... | 279/133 |
| 5,930,143 A * | 7/1999 | Savazzi | ..................... | 700/195 |
| 6,059,702 A | 5/2000 | Winkler et al. | | |
| 6,839,975 B2 * | 1/2005 | Fujishima | ..................... | 33/645 |
| 7,037,053 B2 * | 5/2006 | Matsumoto et al. | ........ | 409/234 |
| 7,037,248 B2 * | 5/2006 | Takaku | ..................... | 409/194 |

FOREIGN PATENT DOCUMENTS

| | | |
|---|---|---|
| DE | 4238504 | 5/1994 |
| DE | 19607599 A1 * | 9/1997 |

(Continued)

OTHER PUBLICATIONS

Machine Translation of DE-19607599, 5 pages.*
English Abstracts of EP-469414, 4 pages.*
Machine Translation of EP-469414, 6 pages.*

(Continued)

*Primary Examiner*—Erica Cadugan
(74) *Attorney, Agent, or Firm*—Reising, Ethington, Barnes, Kisselle, P.C.

(57) ABSTRACT

In the method, a tool is tested for an aligning fit or an imbalance in a tool spindle. The tool spindle is set into rotation. A light beam is used to check whether the tool wobbles. The tool spindle and the light beam are moved relative to one another until the light beam impinges on the area covered by the wobbling movement and a received signal generated from the light beam has an intermittent signal path for the first time. The then prevailing relative position between the tool spindle and the light beam is evaluated in respect of a non-aligning fit of the tool or in respect of a tool imbalance.

9 Claims, 5 Drawing Sheets

FOREIGN PATENT DOCUMENTS

| | | |
|---|---|---|
| EP | 0469414 | 2/1992 |
| JP | 2-243252 A * | 9/1990 |
| JP | 11-188577 A * | 7/1999 |
| JP | 11188577 | 7/1999 |
| WO | 97/31751 | 9/1997 |

OTHER PUBLICATIONS

English Abstracts for DE-4238504, 3 pages.*

Machine Translation of DE-4238504, 13 pages.*

* cited by examiner

METHOD FOR TESTING THE FIT OR IMBALANCE OF A TOOL

BACKGROUND OF THE INVENTION

1. Field of the Invention

The invention relates to a method for testing the fit or imbalance of a tool which is accommodated in a replaceable manner in a tool spindle mounted so that it may be driven in rotation about a central longitudinal axis.

A tool spindle of this type is used in a machine tool. In order to achieve high machining accuracy, the inserted tool should run as true as possible. Deviations from concentricity may result due to a non-aligning fit, caused by contaminants, of the tool in the tool spindle or due to some types of tool imbalances. Such irregularities are to be detected and rectified.

2. Background Art

It is known from U.S. Pat. No. 6,059,702 to clean the abutment surfaces with compressed air or with the cooling means of the machine tool when the tool is inserted. Moreover, it is possible to check the correct, i.e. aligning fit of the tool, following insertion, by introducing compressed air and by detecting the resulting reduction in pressure. However, a separate pressure measuring device is required for this purpose. The checking procedure also takes a relatively long time, since the drop in pressure to be analysed generally only takes place slowly.

Furthermore, WO 97/31751 A1 discloses a method for avoiding thermally induced changes in position of the tool using a light barrier comprising a transmitter and a receiver. The fit or imbalance is not tested in this method.

SUMMARY OF THE INVENTION

The object of the invention is to provide a simple and rapid method for testing fit or imbalance.

This object is achieved in the method according to the invention by the following working steps:
- the tool spindle is set into rotation about the central longitudinal axis,
- a light beam is emitted continuously from a transmitter with a radiating direction perpendicular to the central longitudinal axis and directed onto a receiver, wherein the measurement portion is located between the transmitter and the receiver, and
- the receiver generates a received signal from the incoming light beam,
- the rotating tool spindle and the light beam are moved relative to one another in a relative movement during a monotonic change of the distance between the central longitudinal axis and the direction of radiation,
- a first relative position is detected between the tool spindle and the light beam, in which first relative position the received signal has for the first time an intermittent signal path, and is evaluated with respect to a non-aligning fit of the tool in the tool spindle or with respect to an imbalance of the tool.

The fundamental recognition of the invention is that an intermittent signal path indicates an irregularity, i.e. a non-aligning fit or a tool imbalance. Moreover, it is possible to derive further information about the nature and extent of the irregularity using the first relative position which may then be detected and in which the intermittent signal path appears for the first time. The method according to the invention requires virtually no separate components. It uses in particular the means which are already provided for the three-dimensional positioning of the tool spindle and the light barrier known for avoiding thermally induced changes in position of the tool. Thus, the additional expense in terms of apparatus for the method according to the invention for fit or imbalance testing is fundamentally negligible. Moreover, all the working steps of the method according to the invention may be carried out quickly. In particular, it is possible to measure a light beam within a very short time.

An embodiment wherein a second relative position is detected between the tool spindle and the light beam, in which second relative position the received signal has an intermittent signal path for the last time, and is then evaluated allows a more accurate determination of the irregularity. Using the two detected relative positions, it is possible to determine the minimum and also the maximum extent of a wobbling movement of the tool caused by the irregularity. When a difference value is produced from the first and second relative positions, it is easily possible to provide information about the double extent of the wobbling movement. A simpler improved evaluation is possible by taking into account the double extent determined in this manner.

When the difference value is compared with previously determined and stored error reference values makes it easily possible to specify in more detail the prevailing irregularity using a table with known types of irregularities.

The relative movement may be carried out particularly easily when two main displacement directions, perpendicular to the central longitudinal axis, are provided and the rotating tool spindle is moved in one of the two main displacement directions. In this case one of the drives provided for the two main displacement directions may remain un-operational.

Further features, advantages and details of the invention will become apparent from the ensuing description of exemplary embodiments, taken in conjunction with the drawings.

DESCRIPTION OF THE PREFERRED EMBODIMENTS

Figure 1:
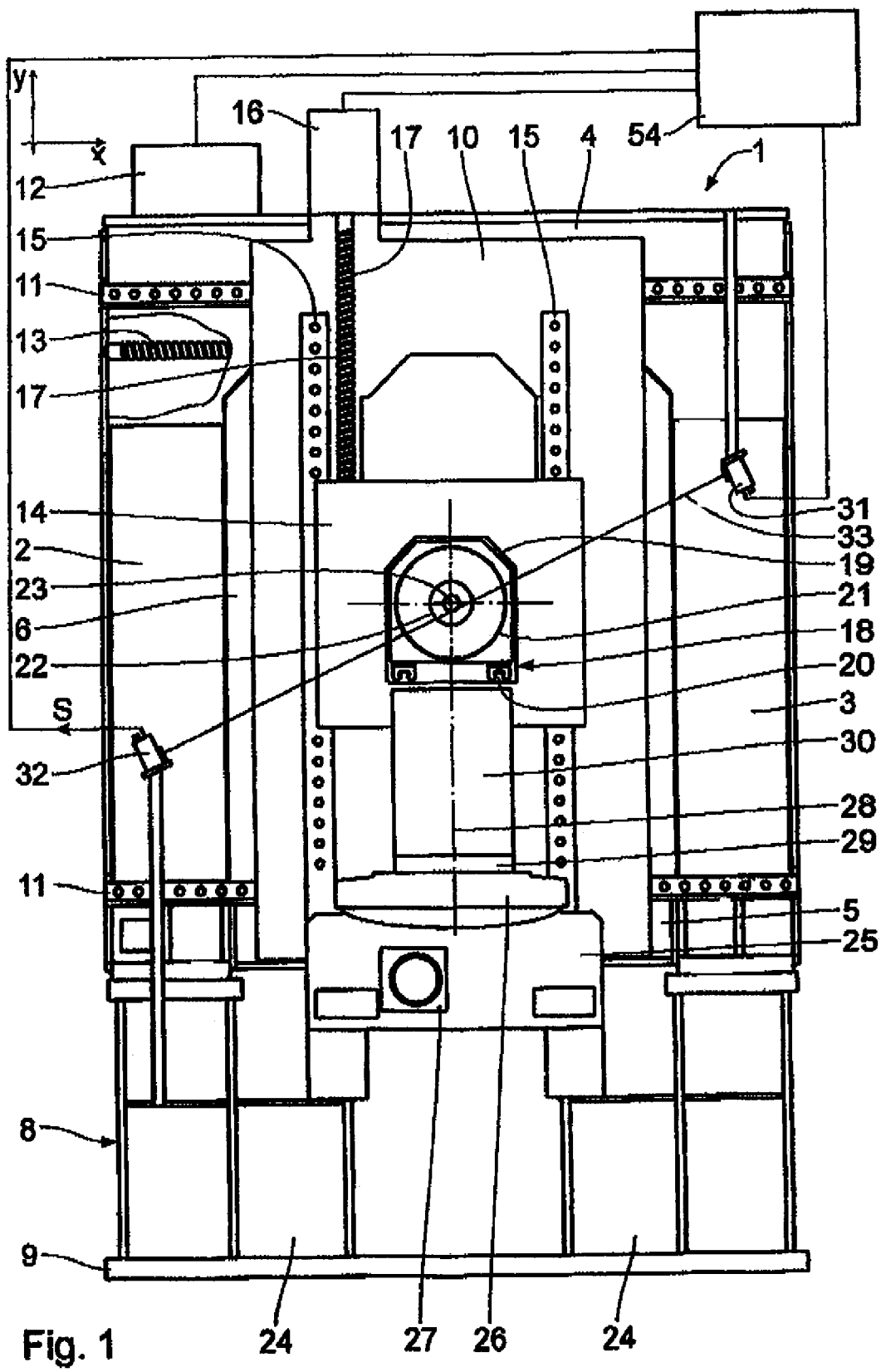
FIG. 1 shows a front view of a machine tool with a tool spindle which may be positioned in three-dimensions and driven in rotation, for receiving a tool, and with a light barrier.

The machine tool shown in FIG. 1 has a stand 1 which, seen in the horizontal z-direction, is rectangular, that is, approximately square, and is formed by a frame and by vertical side supports 2, 3 extending in the y-direction and by a respective horizontal upper cross spar 4 and lower spar 5 extending in the x-direction and joining these supports 2, 3. The side supports 2, 3 and the cross spars 4, 5 are formed by hollow profiles and enclose an interior 6 which is open at both ends seen in the z-direction, that is, in particular towards a work area 7. The stand 1 is supported on a foundation or a foundation plate 9 by an underframe 8.

An x-slide 10 which is also configured in the manner of a frame is positioned to be movable in the x-direction on the end face of the stand 1 facing the work area 7. A respective x-guide rail 11, on which the x-slide 10 is guided, is positioned on the cross spars 4, 5. The x-slide 10 is driven by an x-motor 12 via an x-axis spindle 13 extending in the x-direction and mounted in the side supports 2, 3 of the stand 1, A y-slide 14 displaceable in the y-direction, i.e. vertically, is movably guided on the end face, turned towards the work area 7, of the x-slide 10. A respective y-guide rail 15, on which the y-slide 14 is movably guided, is positioned on the side regions of the frame-like x-slide 10. The y-slide 14 is driven by a y-motor 16 attached to the x-slide 10 via a y-axis spindle 17.

Located on the y-slide 14 is a tool spindle unit configured as a z-slide 18. Said unit comprises a housing-type sleeve 19 which is movably guided on z-guide rails 20 attached in the y-slide 14. Movement in the z-direction takes place in a conventional manner by a motor which is not shown in the drawing. A tool housing 21 having respectively a substantially circular cross section is positioned in the sleeve 19 in a non-rotatable manner and so as to be unable to move in the z-direction, and the actual tool spindle 22 in turn is mounted in said housing 21 to be driven in rotation about a central longitudinal axis 23 extending in the z-direction.

Mounted in the work area 7 in front of the stand 1 on the foundation plate 9 is a workpiece carrier bed 24 on which is supported a workpiece carrier 25 configured in the manner of a bridge. Located on the workpiece carrier 25 is a B-axis rotary table 26 which may be rotationally driven by a B-torque motor 27 attached to the workpiece carrier 25, about a vertical B-rotational axis 28, i.e. running parallel to the y-direction. A workpiece carrier 29 which is able to receive a workpiece 30 to be machined is fitted to the y-rotary table 26.

The machine tool described thus far is known in principle and is conventional in practice.

Positioned in front of the stand 1 in the region of the work area 7 and in front of the side support 3 is a laser transmitter 31 with which a laser receiver 32 is associated which is supported on the underframe 8 in front of the opposite side support 2. A laser signal, i.e. a laser light beam 33, may be transmitted from the laser transmitter 31 to the laser receiver 32. The laser transmitter 31 and laser receiver 32 are mounted in a stationary manner on the machine tool, forming a light barrier. Details thereof will be provided in the subsequent text.

Figure 2:
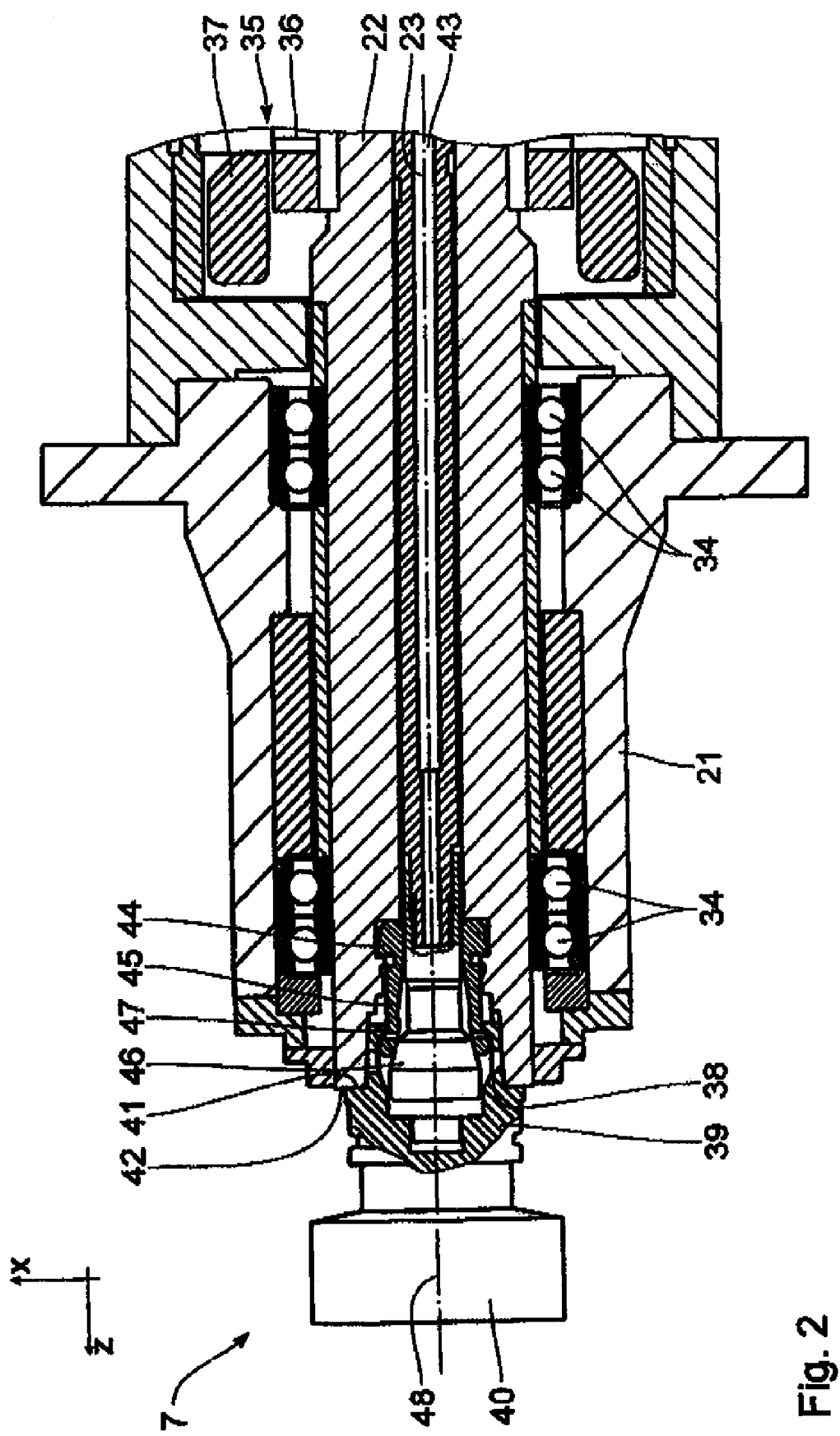
FIG. 2 shows a partial cross-section of the tool spindle according to FIG. 1 with aligning fit of the installed tool.

As shown in FIG. 2, the tool spindle 22 is configured as a hollow shaft mounted so as to be rotatable by roller bearings 34 in the tool spindle housing 21. The right-hand side of FIG. 2 shows a portion of the spindle drive motor 35, namely the moving plates 36 rotationally engaged with the tool spindle 22 and the stator end windings 37 positioned non-rotatably in the tool spindle housing 21.

The free end of the tool spindle 22 facing the work area 7 is provided with a receptacle 38 which tapers conically inwards and into which is inserted a hollow shaft cone 39 of a tool 40 to be accommodated. The tool also has an abutment surface 41 which extends radially to the central longitudinal axis 23 and rests against an end face 42, extending radially towards the axis 23, of the tool spindle 22 when the tool 40 is aligned in the tool spindle 22.

Positioned in the tool spindle 22, configured as a hollow shaft, is a tension rod 43 which operates a collet chuck 44, said chuck engaging in the hollow shaft cone 39. Said collet chuck 44 comprises individual clamping elements 45 which are pushed outwards by a spreading cone 46 when the tension rod 43 moves into the tool spindle 22 and engage behind corresponding projections 47 in the hollow shaft cone 39, thereby tightening the tool 40 with the tool spindle 22. A configuration of this type of a tool spindle 22 including an activating unit for the tension rod 43 is known and quite common in practice.

Figure 3:
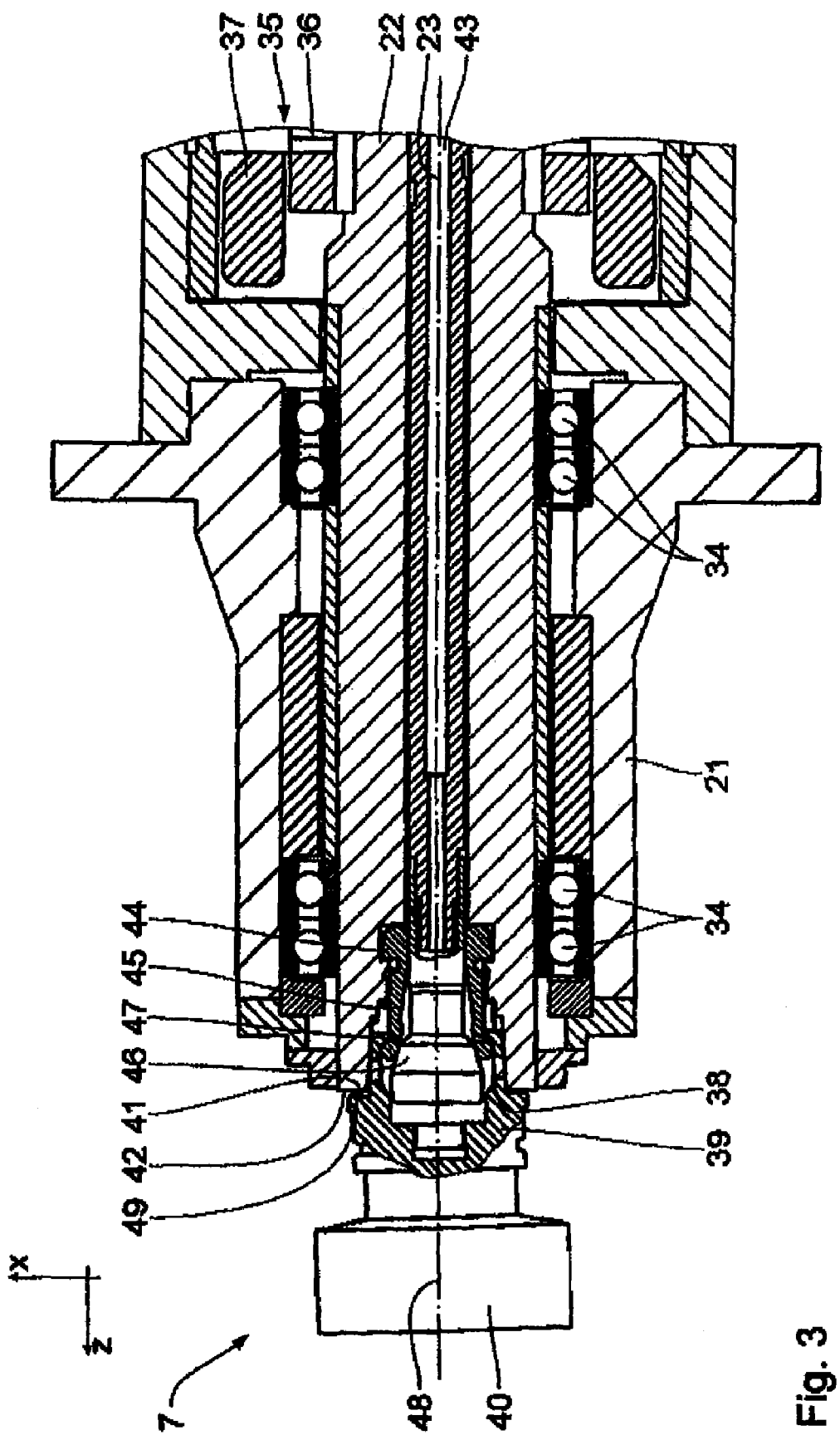
FIG. 3 shows a partial cross section of the tool spindle according to FIG. 1 with non-aligning fit of the installed tool.
Figure 4:
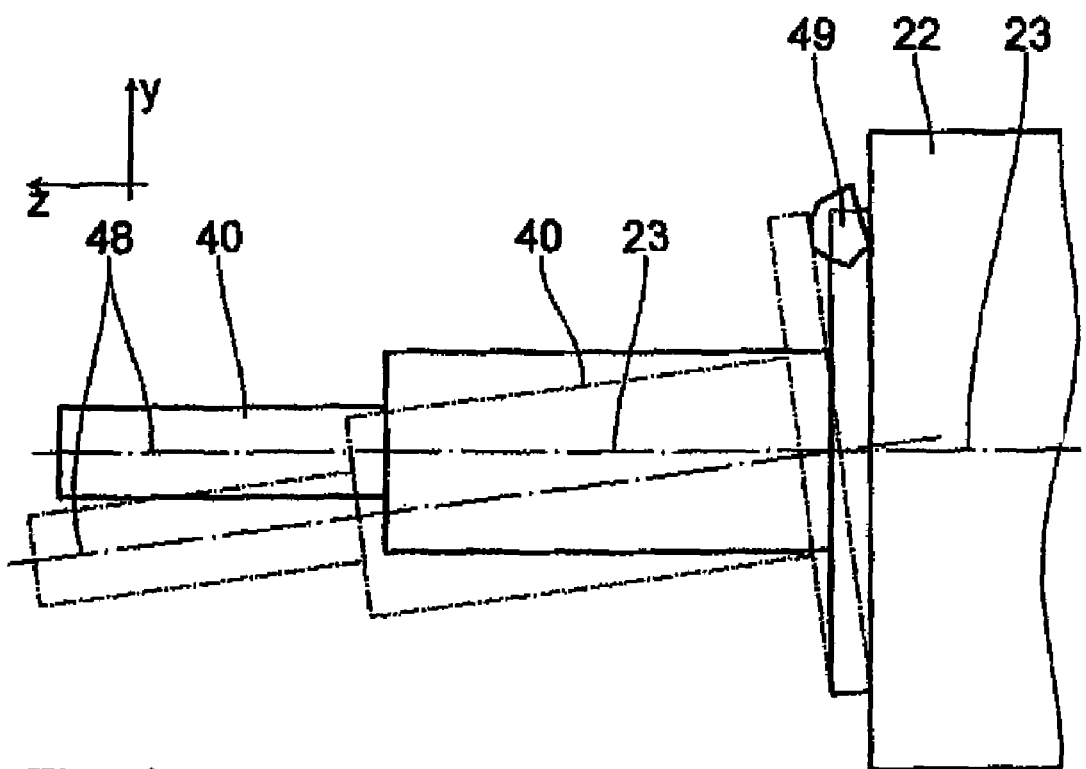
FIG. 4 shows a diagrammatic comparison of an aligning and a non-aligning fit, caused by contamination, of the non-rotating tool.
Figure 5:
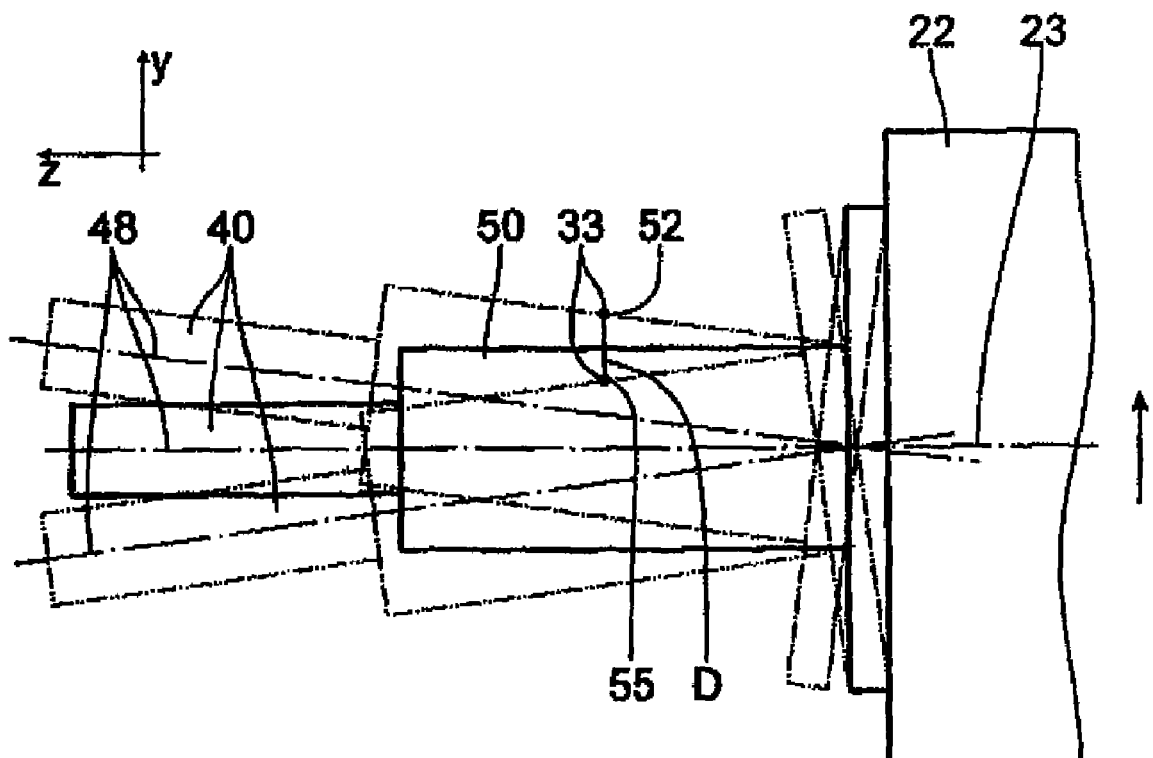
FIG. 5 shows a diagrammatic comparison of a tool rotation with aligning and non-aligning fit.

FIG. 2 shows that the tool 40 is correctly installed in the tool spindle 22 since the central longitudinal axis 48 of the tool 40 aligns with the central longitudinal axis 23 of the tool spindle 23. However, it is also possible for the axis 48 not to align with the axis 23. This is the case, for example, if there is a contaminant 49 in the form of a metal filing or the like between the abutment surface 41 and the end face 42. In this case, the tool 40 undergoes a wobbling movement relative to the tool spindle 22 during rotational drive of the tool spindle 42. This is shown in FIG. 3 for the configuration of the tool spindle 22 according to FIG. 2. FIG. 4 shows in dash-dot lines a non-aligning installation of this type of the tool 40 compared to the aligning position which is shown in solid lines. FIG. 5 shows in dash-dot lines the untrue rotation of the tool 40 compared to the aligning tool 40 shown in solid lines. Apart from the contaminant 49, an imbalance in the tool 40 may also give rise to a wobbling movement of this type. Both causes are summarised in the following by the term 'irregularity'.

The following description explains the method, also with reference to the diagrams according to FIG. 6*a* to 6*d*, by which an untrue rotation of the tool 40 is detected and evaluated, thereby checking whether the tool 40 is aligned in the tool spindle 22 and/or whether it is unbalanced, which is not shown in more detail in the figures.

The tool spindle 22 with the installed tool 40 is positioned in the z-direction such that a measurement portion 50, having a round cross-section, of the tool 40 is located between the laser transmitter 31 and the laser receiver 32. The x-slide 10 and/or the y-slide 14 then moves the measurement portion 50 in the x-y plane relative to the laser light beam 33, a distance varying between the central longitudinal axis 23 and a radiating direction of the laser light beam 33.

The tool spindle 22 is set into rotation and brought into a starting position in the x-y plane in which the laser light beam 33 moves past the measurement portion 50, impinges on the laser receiver 32 and there produces a received signal S. In this starting position, the wobbling movement of the tool 40 shown in FIG. 5 is not detected by the laser light beam 33. Accordingly, the received signal S has a continuous signal path 51 plotted over a time t in the diagram according to FIG. 6*a*.

The tool spindle 22 is then moved relative to the light beam 33 in that the y-motor 16 carries out a movement, shown by the arrow in FIG. 5, in the y-direction. This continues until the laser light beam 33 impinges for the first time on the area covered by the wobbling movement of the tool 40 which has been inserted in a non-aligning manner. At this outer edge 52 of the area covered by the wobbling movement, the received signal S has an intermittent signal path 53 shown in the diagram according to FIG. 6*b*. The relevant position of the tool spindle 22 is recorded and stored in a control and evaluation unit 54 for further assessment. The control and evaluation unit 54 is connected to the laser transmitter 31, the laser receiver 32 and to the x- and y-motors 12 and 16 respectively, so that the respectively prevailing position of the tool spindle 22 in the x-y plane is known in the control and evaluation unit 54. When the laser light beam 33 sweeps over the edge 52, interruptions lasting only a very short time result in the signal path 53.

While the laser light mean 33 impinges on the area covered by the wobbling movement, it is shut off from the laser receiver 32 by the wobbling tool 40 for a certain period of time, namely the interruption time, per complete rotation of the tool spindle 22. On the other hand, the laser light beam 33 reaches the laser receiver 32 during the remaining rotation time.

The interruption time increases as the movement of the work tool spindle 33 increases in the y-direction, until the laser light beam 33 reaches the inner edge 55 of the area covered by the wobbling movement. The received signal S then has for the last time an intermittent signal path 56 with very long interruptions, shown in the diagram according to FIG. 6c. This position of the tool spindle 22 is also recorded and stored in the control and evaluation unit 54 for further assessment.

Figure 6A:
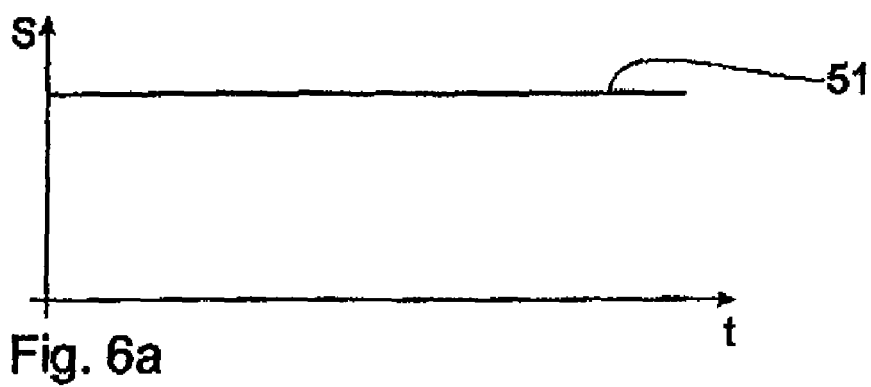
FIG. 6*a*–6*d* show diagrams of a received signal detected at the light barrier according to FIG. 1 with continuous and intermittent signal path.
Figure 6B:
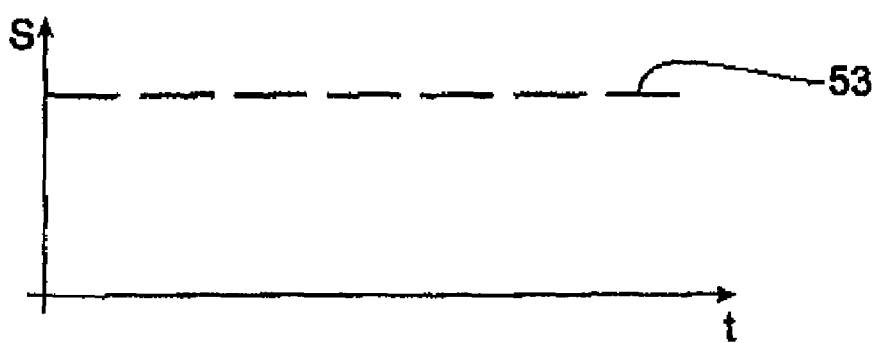
Figure 6C:
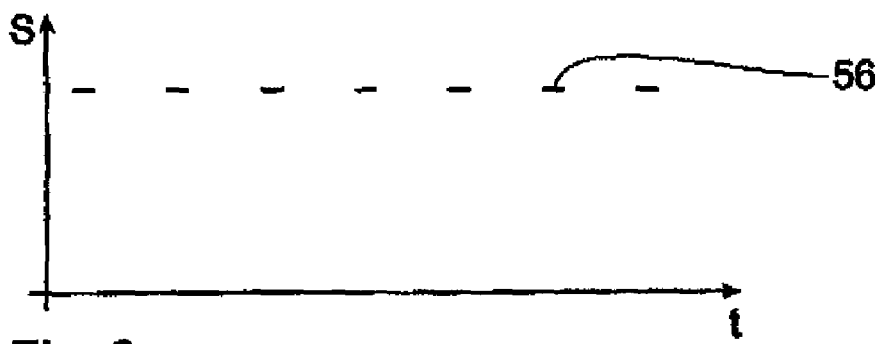
Figure 6D:

During a further displacement of the tool spindle 33 in the y-direction, the laser light beam 33 is completely blocked by the measurement portion 50 and no received signal S is detected at the laser receiver 32. This absence of a received signal S shown in the diagram according to FIG. 6d is understood here as being a constant over time.

FIG. 5 shows the laser light beam 33 upon reaching the outer and inner edges 52 and 55 respectively of the area covered by the wobbling movement. A subtraction calculation and optionally a further signal processing is used to derive the magnitude of the wobbling movement, in particular the double extent D thereof, from the positions stored for these two borderline cases. The reason for the prevailing wobbling movement, thus for example the contaminant 49, is specified in more detail using a comparison with known data which has been determined in a comparable manner for various irregularities giving rise to a wobbling movement and has been stored as error reference values. A decision is then made whether the irregularity can still be tolerated or whether the tool 40 will have to be re-inserted or replaced by another one.

The movement of the tool spindle 22 may in principle also take place in any other direction within the x-y plane, as long as at least one of the two edges 52 and 55 of the area covered by the wobbling movement is traversed by the laser light beam 33 during the displacement movement and the characteristic first or last occurrence of the intermittent signal path appears. Merely a displacement parallel to the radiating direction of the laser light beam 33 is unsuitable.

Moreover, it is possible to initially direct the laser light beam 33 onto the central longitudinal axis 23 and to allow it to pass through, in the opposite direction, the area covered by the wobbling movement, so that there results a reversed time sequence of the signal paths shown in FIG. 6a to 6d for the received signal S. Furthermore, the inner and outer edges 55 and 52 respectively of the area covered by the wobbling movement may be determined by two successive test runs.

Likewise it is possible for the evaluation to be made using only a single position of the tool spindle 22. In this case, the position may be determined either for the inner or the outer edge 55 or 52 respectively of the area covered by the wobbling movement, and then stored. This is adequate information for determining the maximum or minimum extent of the wobbling movement. It is then optionally also possible, during the further evaluation, for known geometric data of the tool 40 to also be considered in order to specify the irregularity in more detail.

Although the laser light beam 33 produces particularly accurate results due to its small beam diameter, a different light beam or a different type of radiation is basically also possible.

What is claimed is:

1. Method for testing the fit or imbalance of a tool which is replaceably accommodated in a tool spindle which spindle is mounted so that it may be driven in rotation about a central longitudinal axis and which tool has a measurement portion with a round cross-section, the method comprising the following working steps:
   the tool spindle is set into rotation about the central longitudinal axis,
   a light beam is emitted continuously from a transmitter with a radiating direction perpendicular to the central longitudinal axis and directed onto a receiver, wherein the measurement portion is located between the transmitter and the receiver, and
   the receiver generates a received signal from the incoming light beam,
   the rotating tool spindle and the light beam are moved relative to one another in a relative movement during a monotonic change of the distance between the central longitudinal axis and the direction of radiation,
   a first relative position is detected between the tool spindle and the light beam, in which first relative position the received signal has for the first time an intermittent signal path, and is evaluated with respect to a non-aligning fit of the tool in the tool spindle or with respect to an imbalance of the tool.

2. Method according to claim 1, wherein a second relative position is detected between the tool spindle and the light beam, in which second relative position the received signal has an intermittent signal path for the last time, and is then evaluated.

3. Method according to claim 2, wherein a difference value is produced from the first and second relative positions.

4. Method according to claim 3, wherein the difference value is compared with previously determined and stored error reference values.

5. Method according to claim 1, wherein the rotating tool spindle is displaced for the relative movement between the rotating tool spindle and the light beam.

6. Method according to claim 5, wherein two main displacement directions, perpendicular to the central longitudinal axis, are provided and the rotating tool spindle is moved in one of the two main displacement directions.

7. Method according to claim 1, wherein the rotating tool spindle and the light beam are positioned with respect to one another before start of the relative movement such that the central longitudinal axis and the direction of radiation intersect and the distance between the central longitudinal axis and the direction of radiation is increased during the relative movement.

8. Method according to claim 1, wherein the rotating tool spindle and the light beam are positioned with respect to one another before start of the relative movement such that the light beam passes over the measurement portion, and the distance between the central longitudinal axis and the direction of radiation is reduced during the relative movement.

9. Method according to claim 1, wherein a laser light beam is provided as the light beam.

* * * * *

UNITED STATES PATENT AND TRADEMARK OFFICE
CERTIFICATE OF CORRECTION

PATENT NO. : 7,217,071 B2  Page 1 of 1
APPLICATION NO. : 11/458724
DATED : May 15, 2007
INVENTOR(S) : Thomas Bayha and Andreas Berger It is certified that error appears in the above-identified patent and that said Letters Patent is hereby corrected as shown below:

Column 4, line 15 delete [23] after "spindle" and insert therein --2--
Column 4, line 21 delete [42] and insert therein --22--
Column 5, line 5 delete [mean] and insert therein --beam--
Column 5, line 21 delete [33] and insert therein --22--

Signed and Sealed this

Eighth Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,217,071 B2  Page 1 of 1
APPLICATION NO. : 11/458724
DATED : May 15, 2007
INVENTOR(S) : Thomas Bayha and Andreas Berger It is certified that error appears in the above-identified patent and that said Letters Patent is hereby corrected as shown below:

Column 4, line 15 delete [23] after "spindle" and insert therein --22--
Column 4, line 21 delete [42] and insert therein --22--
Column 5, line 5 delete [mean] and insert therein --beam--
Column 5, line 21 delete [33] and insert therein --22--

This certificate supersedes the Certificate of Correction issued July 8, 2008.

Signed and Sealed this

Twenty-sixth Day of August, 2008

JON W. DUDAS
*Director of the United States Patent and Trademark Office*